United States Patent
Kanbe et al.

[11] Patent Number: 5,526,149
[45] Date of Patent: * Jun. 11, 1996

[54] REFLECTION TYPE LIQUID CRYSTAL DISPLAY DEVICE

[75] Inventors: Makoto Kanbe, Tenri; Seiichi Mitsui, Nara, both of Japan

[73] Assignee: Sharp Kabushiki Kaisha, Osaka, Japan

[ * ] Notice: The term of this patent shall not extend beyond the expiration date of Pat. No. 5,418,635.

[21] Appl. No.: 107,226

[22] Filed: Aug. 16, 1993

[30] Foreign Application Priority Data

Aug. 28, 1992 [JP] Japan ................. 4-230082

[51] Int. Cl.$^6$ .................. G02F 1/1335; G02F 1/1343
[52] U.S. Cl. .................. 359/70; 359/87; 359/54
[58] Field of Search .................. 359/70, 62, 87, 359/54, 859, 871

[56] References Cited

U.S. PATENT DOCUMENTS

| | | | |
|---|---|---|---|
| 4,431,272 | 2/1984 | Yazawa et al. | 359/70 |
| 4,456,336 | 6/1984 | Chung et al. | 359/70 |
| 4,519,678 | 5/1985 | Komatsubara et al. | 359/70 |
| 5,176,982 | 1/1993 | Mikogami et al. | 359/70 |
| 5,418,635 | 5/1995 | Mitsui et al. | 359/70 |

FOREIGN PATENT DOCUMENTS

| | | |
|---|---|---|
| 0084930 | 8/1983 | European Pat. Off. . |
| 0495679A3 | 7/1992 | European Pat. Off. . |
| 0536898A1 | 4/1993 | European Pat. Off. . |

OTHER PUBLICATIONS

D. White et al., *Journal of Applied Physics*, 45(11):4718–4733 (1974).

T. Koizumi et al., *Proceedings of the SID*, 29(2):157–160 (1988).

*Primary Examiner*—William L. Sikes
*Assistant Examiner*—Kenneth Parker
*Attorney, Agent, or Firm*—David G. Conlin; Peter F. Corless

[57] ABSTRACT

When forming reflection electrodes on a thin film transistor which is a switching element, it is formed on irregular plural bumps, an organic insulating film possessing bumps corresponding to the bumps is formed, and the reflection electrodes are formed thereon. Since the reflection electrodes are formed on the organic insulating film, there is no effect of the thin film transistor, and the reflection electrodes may be formed as largely as possible in a range capable of maintaining the insulation between adjacent reflection electrodes, so that the opening rate may be enhanced to 90% or more.

4 Claims, 9 Drawing Sheets

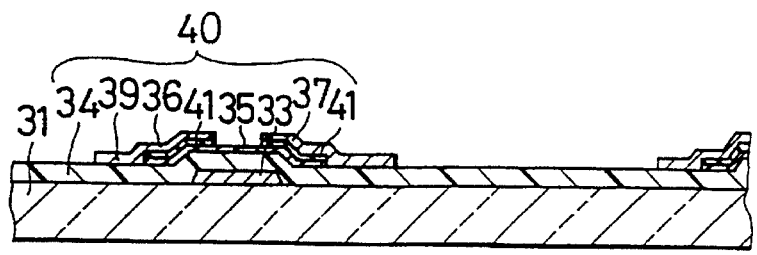
Fig. 4 (1)
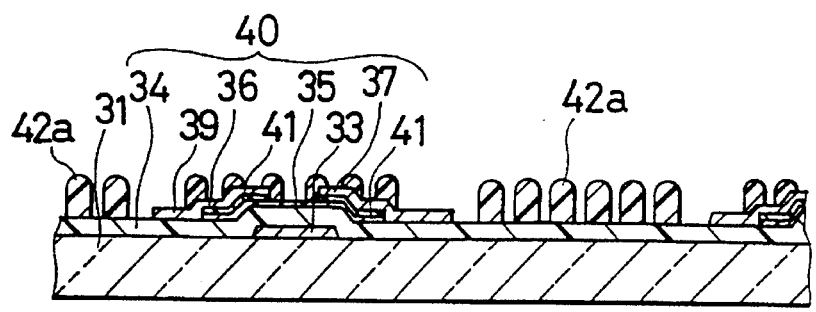
Fig. 4 (2)
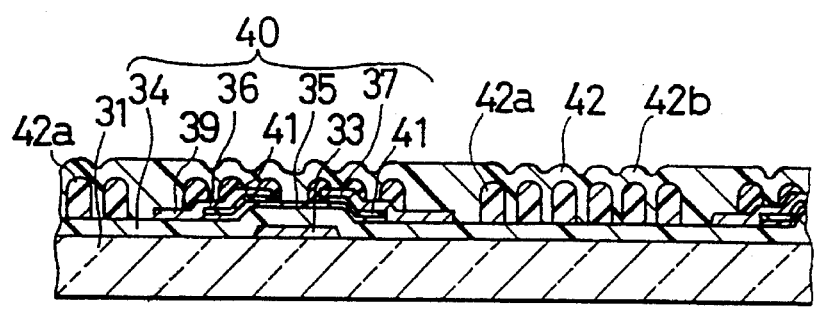
Fig. 4 (3)
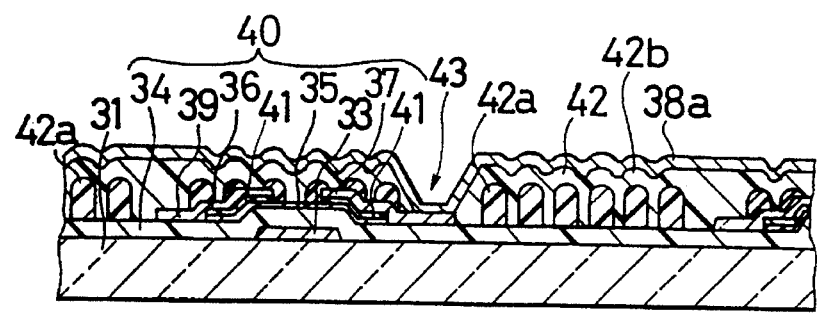
Fig. 4 (4)
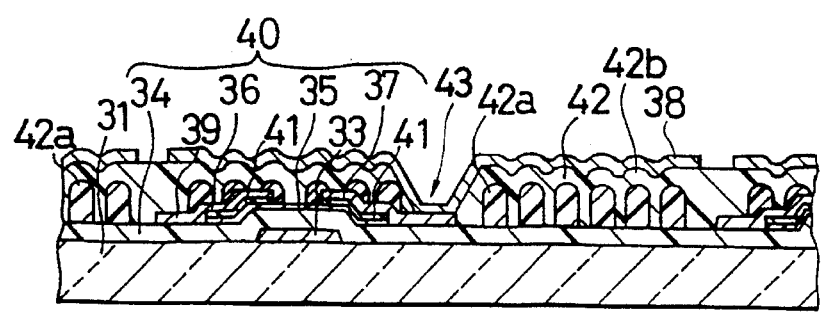
Fig. 4 (5)

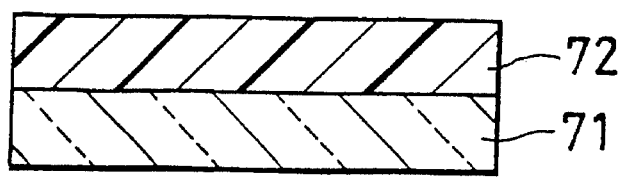
Fig.7(1)
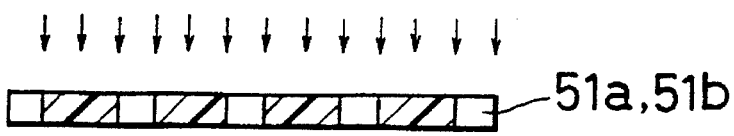
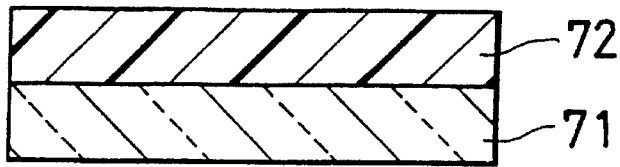
Fig.7(2)
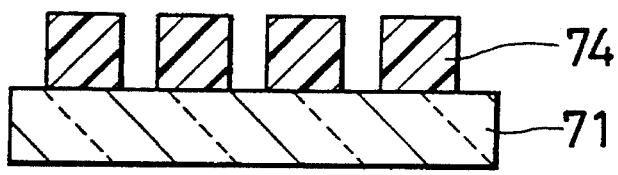
Fig.7(3)
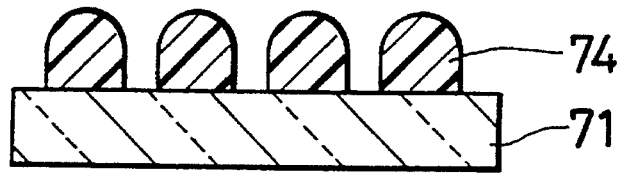
Fig.7(4)
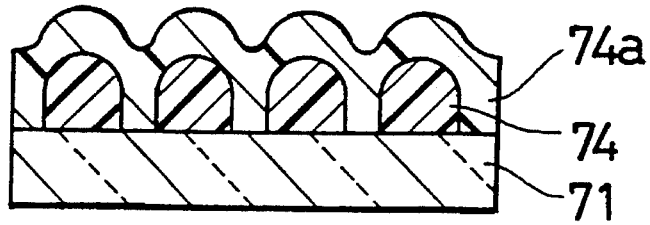
Fig.7(5)
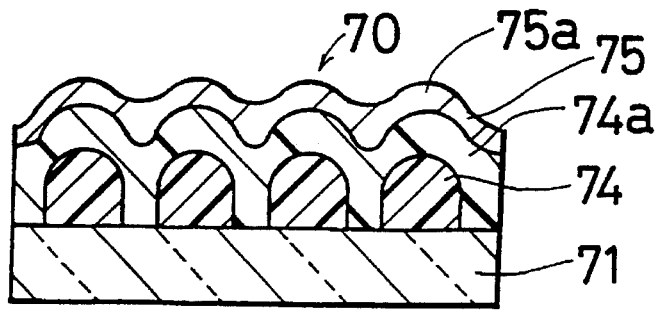
Fig.7(6)

Prior Art Fig. 10
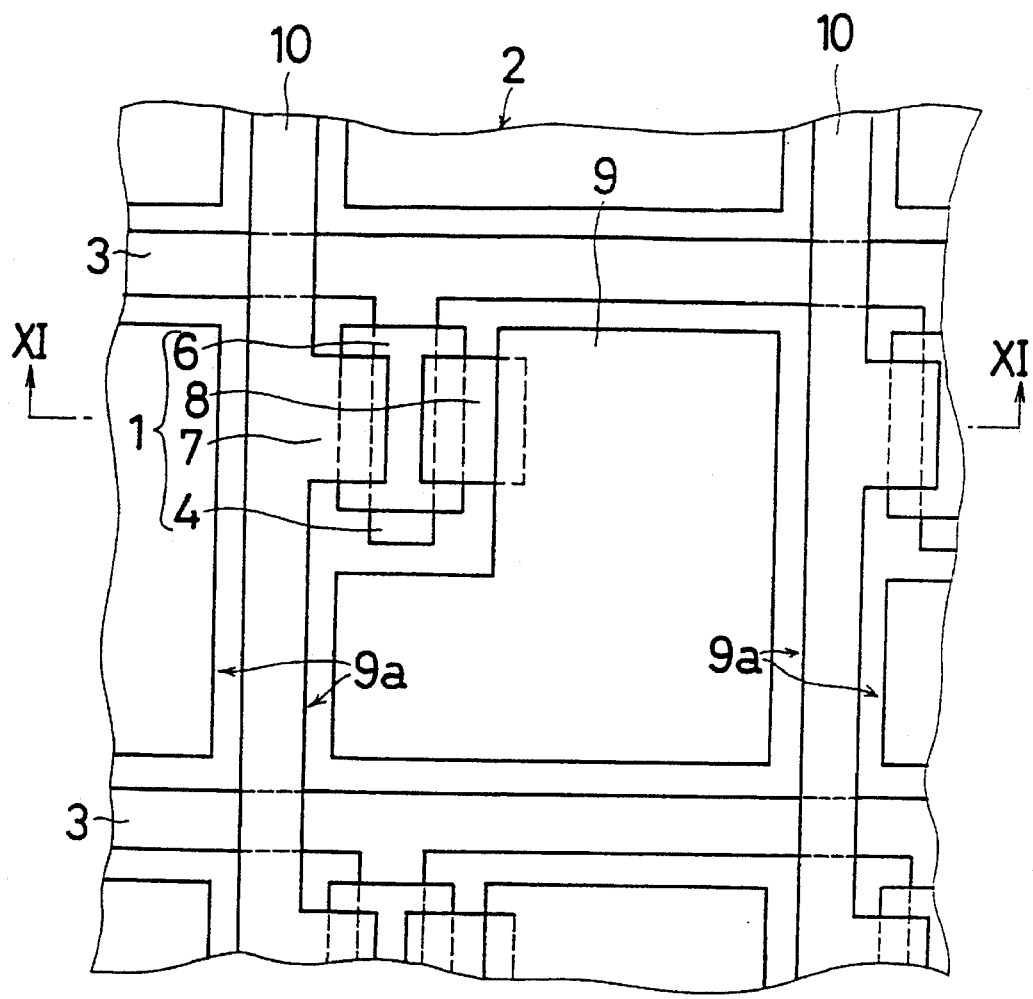
Prior Art Fig. 11
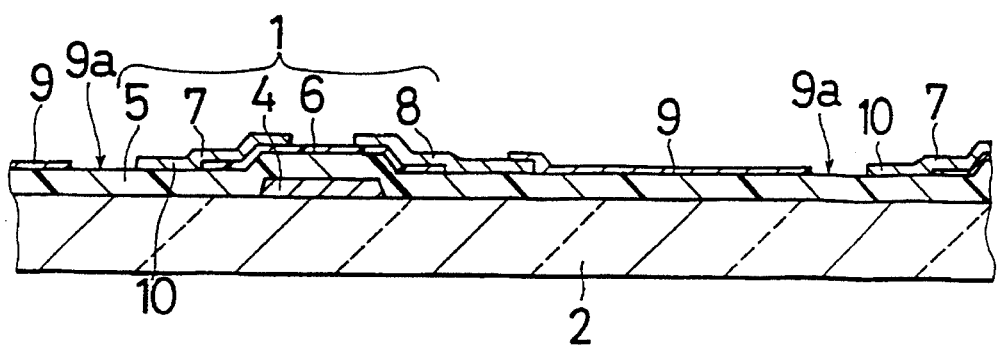

REFLECTION TYPE LIQUID CRYSTAL DISPLAY DEVICE

BACKGROUND OF THE INVENTION

1. Field of the Invention

The present invention relates to a reflection type liquid crystal display device for displaying by reflecting the incident light.

2. Description of the Related Art

Recently applications of liquid crystal display devices in word processor, laptop personal computer, pocket-size television and others are rapidly advancing. In particular, among the liquid crystal display devices, the reflection type liquid crystal display device for displaying by reflecting the entering light is highly noticed because the power consumption is low since the backlight is not needed, and the design is thin and can be reduced in weight.

Hitherto, for the reflection type liquid crystal display device, the TN (twisted nematic) system and STN (super-twisted nematic) system have been employed, but in these methods, ½ of the luminous intensity of natural light is not utilized in display because of the use of the polarizer, and the display is dark.

To solve this problem, display modes for effectively utilizing all of rays of natural light without using polarizer have been proposed. An example of such modes is a phase transition type guest-host system (D. L. White and G. N. Taylor: J. Appl. Phys. 45 4718, 1974). In this mode, the cholesteric-nematic phase transition phenomenon due to electric field is utilized. By combining this system with micro color filter, a reflection type multicolor display is also proposed (Tohru Koizumi and Tatsuo Uchida, Proceedings of the SID, Vol. 29/2, 1988).

To obtain a brighter display in the mode not requiring polarizer, it is necessary to increase the intensity of light scattering in a direction vertical to the display screen, for the incident light from all angles. For this purpose it is needed to make a reflector having an optimum reflective characteristic. The above publication disclose a reflector manufactured by toughening the surface of substrate such as glass with abrasive, controlling the surface asperities by varying the time of etching with hydrofluoric acid, and forming a silver foil on the asperities.

FIG. 10 is a plan view of a substrate 2 possessing a thin film transistor (TFT) which is a switching element used in active matrix system, and FIG. 11 is a sectional view of XI—XI in FIG. 10. On an insulating substrate 2 of glass or the like, plural gate bus wirings 3 made of chromium, tantalum or the like are disposed parallel mutually, and gate electrodes 4 are branched off from the gate bus wirings 3. The gate bus wirings 3 function as scanning lines.

Covering the gate electrodes 4, a gate insulating film 5 made of silicon nitride ($SiN_x$), silicon oxide ($SiO_x$) or the like is formed on the entire surface of the substrate 2. On the gate insulating film 5 above the gate electrodes 4, a semiconductor layer 6 composed of amorphous silicon (a-Si), polycrystalline silicon, CdSe or the like is formed. At one end of the semiconductor layer 6, a source electrode 7 made of titanium, molybdenum, aluminum or the like is superposed. At the other end of the semiconductor layer 6, same as the source electrode 7, a drain electrode 8 made of titanium, molybdenum, aluminum or the like is superposed. At the opposite end of the drain electrode 8 against the semiconductor layer 6, a picture element electrode 9 made of ITO (indium tin oxide) is superposed.

As shown in FIG. 10, source bus wirings 10 crossing the gate bus wirings 3 across the gate insulating film 5 are connected to the source electrode 7. The source bus wirings 10 function as signal lines. The source bus wirings 10 are also made of the same metal as the source electrode 7. The gate electrode 4, gate insulating film 5, semiconductor layer 6, source electrode 7, and drain electrode 8 compose a TFT 1, and this TFT 1 possesses the function of switching element.

To apply the substrate 2 possessing the TFT 1 shown in FIG. 10 and FIG. 11 in a reflection type liquid crystal display device, it is necessary to form the picture element electrode 9 by using a metal possessing light reflectivity such as aluminum and silver, and form the gate insulating film 5 or asperities thereon. Generally, it is difficult to form tapered asperities uniformly on an insulating film made of inorganic matter.

As shown in FIG. 10 and FIG. 11, when forming the reflection electrode 9 and source bus wirings 10 on the gate insulating layer 5, a gap 9a is formed so as to prevent conduction between the reflection electrode 9 and source bus wirings 10. Or, when the reflection electrode 9 is formed on the TFT 1, the source electrode 7 and drain electrode 8 conduct, and the TFT 1 cannot function as switching element, so that the reflection electrode 9 cannot be formed on the TFT 1.

To enhance the luminance of display, it is desired that the reflection electrode 9 be as large as possible. However, as mentioned above, it must be formed so that the reflection electrode 9 may not contact with the source bus wirings 10, and many not overlap with others than the drain electrode 9 of the TFT 1, which results in, to the contrary, smaller surface area of the reflection electrode 9, hence lower luminaries and lower display quality of the reflection type liquid crystal display device.

SUMMARY OF THE INVENTION

It is hence a primary object of the invention to present a reflection type liquid crystal display device enhanced in display quality by solving the problems.

To achieve the object, the invention presents a reflection type liquid crystal display device comprising, transparent substrate, an insulating substrate disposed oppositely to the transparent substrate, a liquid crystal layer interposed between the transparent substrate and the insulating substrate, plural reflection electrodes as display picture elements for reflecting the incident light from the transparent substrate side disposed on the liquid crystal layer side surface of the insulating substrate, distribution electrodes for applying display voltage to the reflection electrodes disposed on the liquid crystal layer side surface of the insulating substrate, and common electrodes possessing light transmissivity disposed nearly over the entire surface on the liquid crystal layer side surface of the transparent substrate, wherein the reflection electrodes are formed on an electric insulating film formed on plural bumps arranged irregularly in a region including the distribution electrodes, at the liquid crystal side on one substrate, and adjacent reflection electrodes are formed in a predetermined region so as to face mutually across a gap.

In the invention, the bumps are made of photosensitive resin.

According to the invention, in the reflection type liquid crystal display device, a liquid crystal layer is interposing between the transparent substrate and the insulating substrate. At this time, plural reflection electrodes and distribution electrodes are formed on the liquid crystal layer side surface on the insulaitng substrate, and common electrodes are formed on the liquid crystal layer side surface on the transparent substrate. The reflection electrodes are display picture elements, and the display is presented by reflecting the incident light entering through the transparent substrate and common electrodes. The distribution electrodes realized by gate bus wiring, source bus wiring and thin film transistor apply the display voltage to the reflection electrodes. The common electrodes formed on the transparent substrate are formed nearly on the entire surface of the transparent substrate.

In the reflection type liquid crystal display device of the invention, the reflection electrodes are formed in a predetermined region on an insulating film composed of high molecular resin or the like, covering the plural bumps irregularly arranged on the entire surface of the insulating substrate, including the connection parts with the reflection electrodes, such as the gate bus wirings, source bus wirings and thin film transistor formed on one substrate, and drain electrodes of thin film transistor on the distribution electrodes. At this time, the adjacent reflection electrodes are formed mutually across a gap. Since the insulating film is formed so as to cover the bumps, the insulating film has asperities corresponding to the bumps. The reflection electrodes are formed on the insulating film having such asperities, and asperities corresponding to these asperities are also formed on the surface of the reflection electrodes. By forming asperities on the light reflection surface, the intensity of the light scattered in a direction vertical to the display screen is increased for the incident light from all angles, and the display luminance is improved, thereby enhancing the display contrast.

The reflection electrodes and distribution electrodes are formed through an organic insulation film except for the connection parts. Accordingly, the region for forming the reflection electrodes will not be influenced by the distribution electrodes, and the area can be increased in a range while keeping electric insulation state between adjacent reflection electrodes, so that the luminance of display may be enhanced.

Thus, according to the invention, on the insulating film formed along bumps on plural irregular bumps obtained by exposing, developing, and heating the photosensitive resin, a reflector made of metal thin film is formed along the bumps of the insulating film. The shape of the reflector is determined by the shape of the photosensitive resin. Since the photosensitive resin can be easily, and uniformly controlled at high repeatability, a reflector possessing excellent reflection properties may be easily formed, so that the display quality of the reflection type liquid crystal display device may be enhanced.

Moreover, since the reflection electrodes are formed on the insulating film, being free from effects of distribution electrodes such as thin film transistor, the reflection electrodes may be formed as largely as possible while maintaining the insulation between adjacent reflection electrodes, and the opening rate may be 90% or more.

In the invention, the bumps are arranged irregularly.

Further in the invention, the bumps are formed in plural shapes differing in size.

BRIEF DESCRIPTION OF THE DRAWINGS

Other and further objects, features, and advantages of the invention will be more explicit from the following detailed description taken with reference to the drawings wherein:

FIG. 4(1)–(5) are sectional views explaining the forming method shown in FIG. 3;

FIG. 7(1)–(6) are sectional views explaining the process in FIG. 6;

FIG. 10 is a plan view of a substrate 2 possessing a thin film transistor 1 which is a switching element used in active matrix system; and FIG. 11 is a sectional view of XI—XI in FIG. 10.

DETAILED DESCRIPTION OF THE INVENTION

Figure 1:
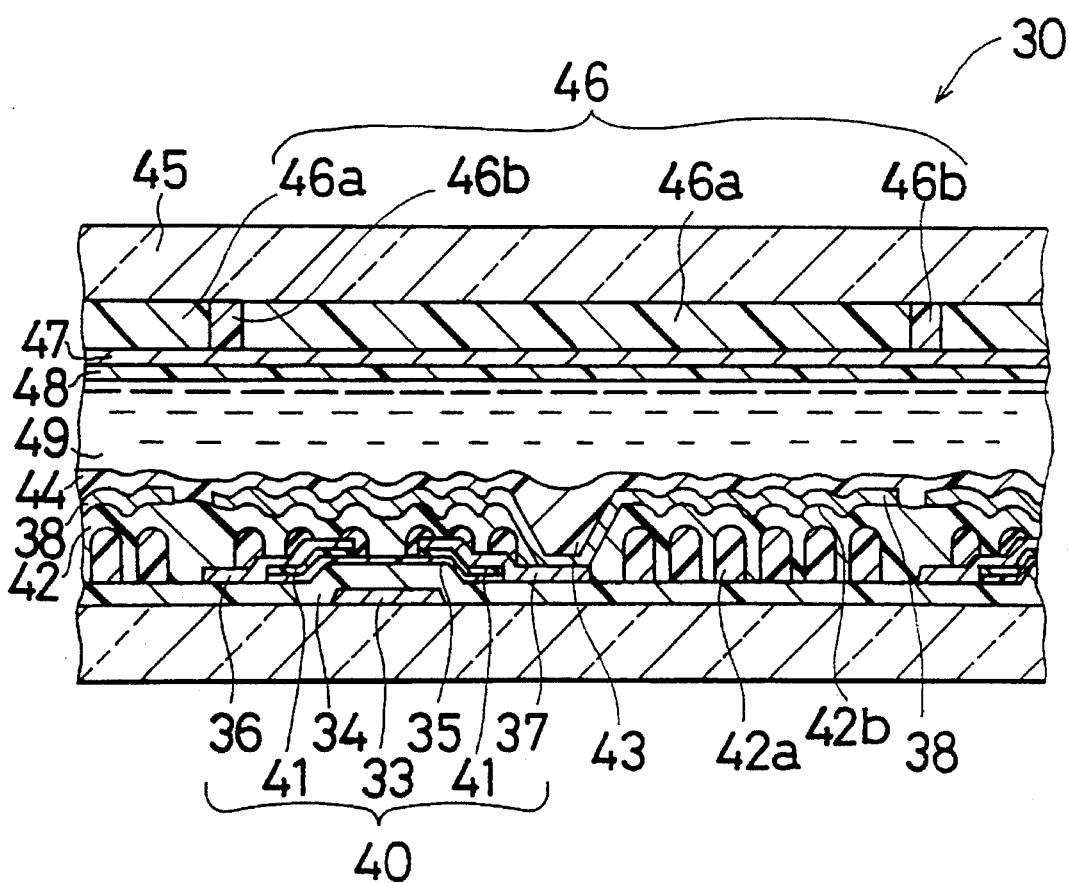
FIG. 1 is a sectional view of a reflection type liquid crystal display device 30 in an embodiment of the invention.

Now referring to the drawing, preferred embodiments of the invention are described below.

Figure 2:
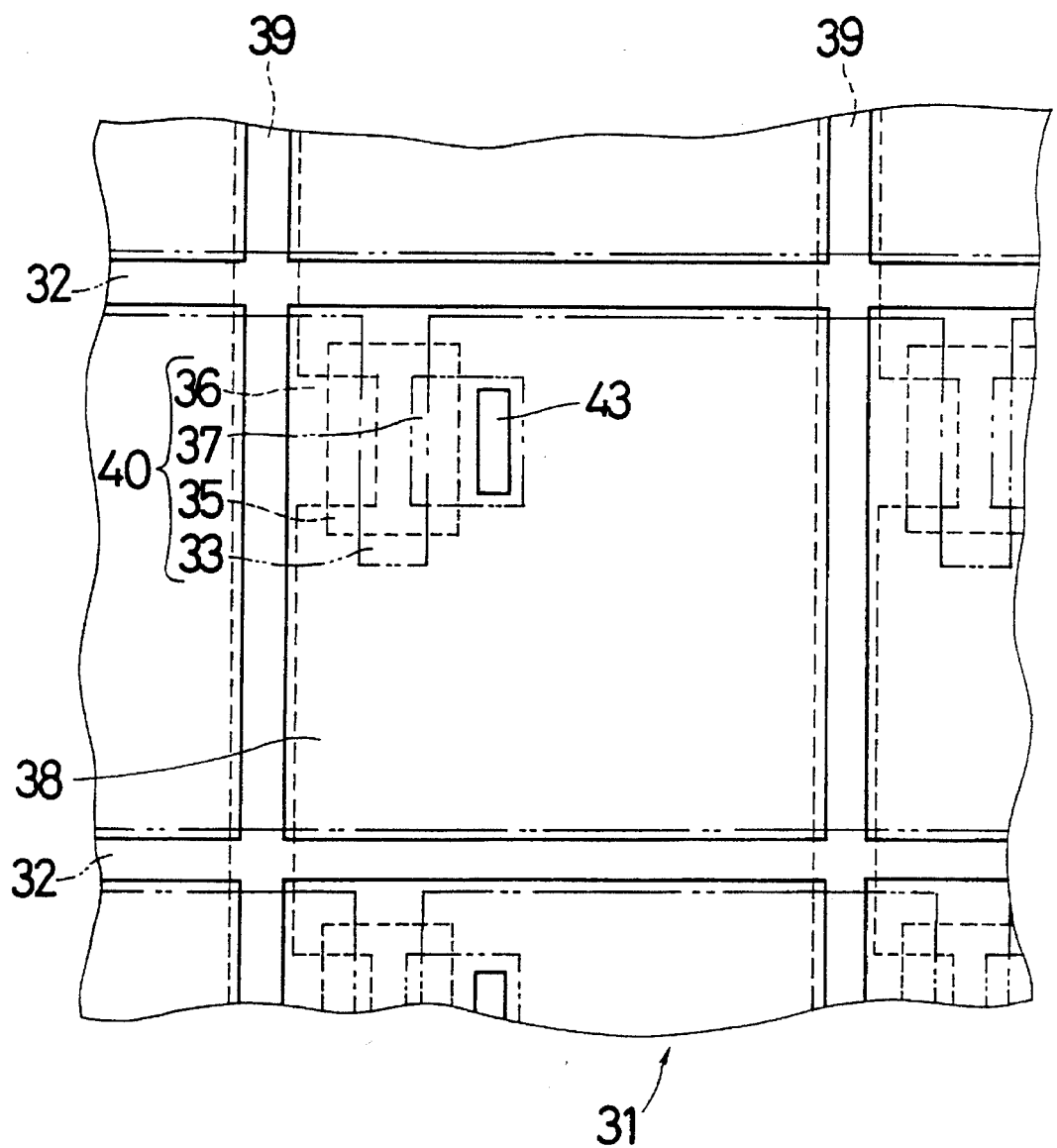
FIG. 2 is a plan view of a substrate 31 shown in FIG. 1.

FIG. 1 is a sectional view of a reflection type liquid crystal display device 30 in an embodiment of the invention, and FIG. 2 is a plan view of a substrate 31 shown in FIG. 1. On an insulating substrate 2 made of glass or the like, plural gate bus wirings 32 made of chromium, tantalum or the like are disposed parallel mutually, and gate electrodes 33 are branched off from the gate bus wirings 32. The gate bus wirings 32 function as scanning lines.

Covering the gate electrode 33 a gate insulating film 34 made of silicon nitride ($SiN_x$), silicon oxide ($SiO_x$) or the like is formed on the entire surface of the substrate 31. On the gate insulating film 34 above the gate electrode 33, a semiconductor layer 35 composed of amorphous silicon (a-Si), polycrystalline silicon, CdSe or the like is formed. At both ends of the semiconductor layer 35, contact electrodes 41 made of a-Si or the like are formed. On one contact electrode 41, a source electrode 36 made of titanium, molybdenum, aluminum or the like is superposed, and on the other contact electrode 41 is superposed a drain electrode 37 made of titanium, molybdenum, aluminum or the like, same as the source electrode 36.

As shown in FIG. 2, source bus wirings 39 crossing the gate bus wirings 32 across the gate insulating film 34 are connected to the source electrode 36. The source bus wirings 39 function as signal lines. The source bus wirings 39 are also made of the same metal as the source electrode 36. The gate electrode 33, gate insulating film 34, semiconductor layer 35, source electrode 36, and drain electrode 37 compose a thin film transistor (TFT) 40, and this TFT 40 possesses the function of switching element.

On the substrate 31 forming the FTF 40, plural bumps 42a are formed irregularly except for the region in which a contact hole 43 is formed. In the contact hole 43 region, the bumps 42a may not be formed, or after forming bumps 42a on the entire surface, the bumps 42a formed in the contact hole region 43 may be removed. Covering the bumps 42a, an organic insulating film 42 is formed on the entire surface of the substrate 31. On the organic insulating film 42, bumps 42b corresponding to the bumps 42a are formed. In the portion of the drain electrode 37, a contact hole 43 is formed. On the organic insulating film 42, a reflection electrode 38 made of aluminum, silver or the like is formed. The reflection electrode 38 is connected to the drain electrode 37 in the contact hole 43. Furthermore, an orientation film 44 is formed thereon.

The reflection electrode 38 is formed so as to be superposed on part of the gate bus wiring 32 and part of source bus wiring 39 through the organic insulating film 42 as shown in FIG. 2. Accordingly, the reflection electrode 38 can be increased in the area in a range permitting the adjacent reflection electrodes 38 to maintain insulation state electrically. Accordingly, the opening rate of the display screen is larger, and a bright display is realized. According to the embodiment, the opening rate may be improved to 90% or more.

On a substrate 45, a color filter 46 is formed. At a confronting position of the color filter 46 to the reflection electrode 38 of the substrate 31, a magenta or green filter 46a is formed, and at a position not confronting the reflection electrode 38, a black filter 46b is formed. On the entire surface of the color filter 46, a transparent electrode 47 made of ITO (indium tin oxide) or the like is formed, and an orientation film 48 is formed further thereon.

The both substrates 31, 45 are glued oppositely so that the reflection electrode 38 and filter 46a may coincide with each other, and a liquid crystal 39 is injected in their space to complete the reflection type liquid crystal display device 30.

Figure 3:
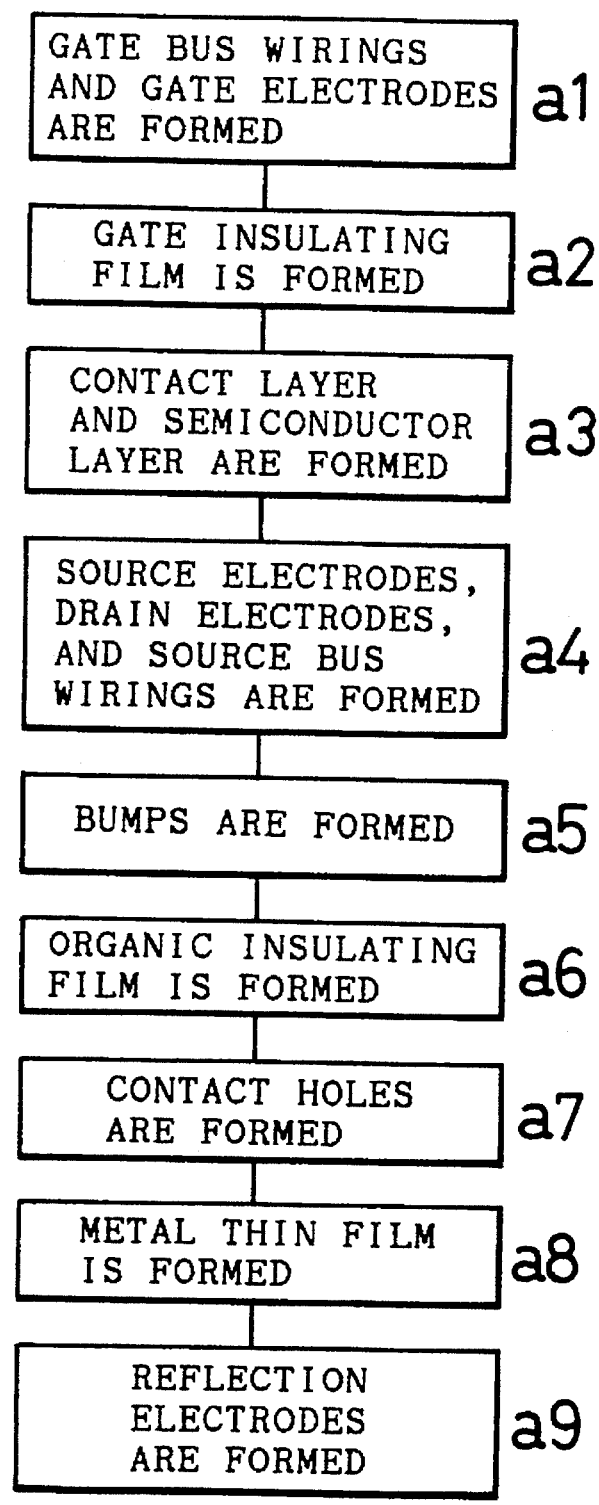
FIG. 3 is a process chart explaining the method for forming reflection electrodes 38 possessing bumps 42a shown in FIG. 1 and FIG. 2.
Figure 5:
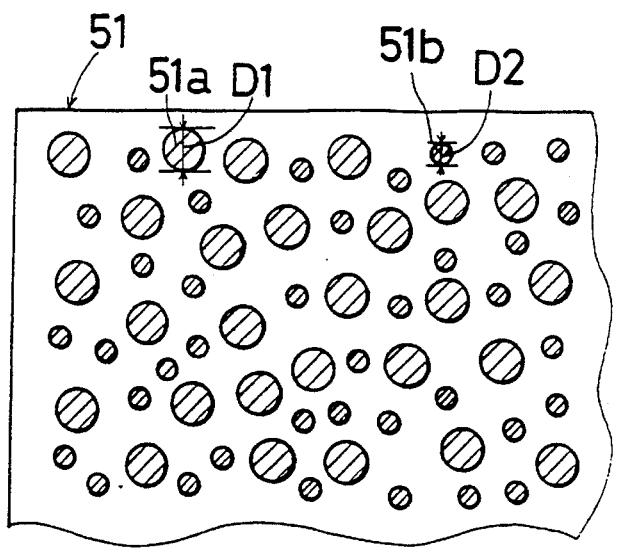
FIG. 5 is a plan view of a mask 51 used in process a5 in FIG. 3.

FIG. 3 is a process chart explaining the method of forming the reflection electrode 38 possessing bumps 42a on the substrate 31 as shown in FIG. 1 and FIG. 2, FIG. 4 is a sectional view explaining the forming method shown in FIG. 3, and FIG. 5 is a plan view of a mask 51 used in step a5 in FIG. 3. FIG. 4(1) relates to step a4 in FIG. 3, FIG. 4(2) step a5 in FIG. 3, FIG. 4(3) to step a6 in FIG. 3, FIG. 4(4) to step a8 in FIG. 3, and FIG. 4(5) to step a9 in FIG. 3.

At step a1, a tantalum metal layer in a thickness of 3000 angstrom is formed on the insulating substrate 31 made of glass or the like by sputtering method, and this metal layer is patterned by photolithography or etching to form the gate bus wirings 32 and gate electrode 33. At step a2 is formed a gate insulating film 34 made of silicon nitride ($SiN_x$) in a thickness of 7000 angstrom by plasma CVD method.

At step a3, an a-Si layer in a thickness of 1000 angstrom as semiconductor layer 35, and an $n^+$ type a-Si layer in a thickness of 400 angstrom as contact layer 41 are formed consecutively in this order. By patterning the formed $n^+$ a-Si layer and a-Si layer, the semiconductor layer 35 and contact layer 41 are formed. At step a4, molybdenum metal is formed on the entire surface of the substrate 31 in a thickness of 2000 angstrom, and by patterning the molybdenum metal film, source electrode 36, drain electrode 37, and source bus wiring 39 are formed, thereby completing the TFT 40. FIG. 4(1) is a sectional view of the substrate 31 forming the TFT 40 after completion of processing up to step a4.

At step a5, a photo resist (OFPR-800) which is a photosensitive resin is applied on the entire surface of the substrate 31 forming the TFT 40 in a thickness of 1200 angstrom, and using a mask 51 shown in FIG. 5, bumps 42a are formed as shown in FIG. 4(2). On the mask 51, circular light shielding regions 51a, 51b indicated in shaded areas are formed irregularly. The diameter D1 of the light shielding region 51a is longer tan the diameter D2 of the light shielding region 51b. For example, D1 is 10 μm, and D2 is 5 μm.

In this embodiment, the mask 51 possessing two light shielding regions 51a, 51b is used, but the mask 51 is not limited to this alone. The light shielding region may be one circle, or three or more circles. As far as the light shielding regions 51, 51b are not formed in the region of the mask 51 for forming the contact hole 43 in a subsequent step a7, bumps 42a are not formed in the contact hole region 43. When the bumps 42a are formed on the entire surface, the bumps in the region of the contact hole 43 may be removed at this step, or may be later removed when forming the contact hole 43 at step a7.

At step a6, polyimide resin is applied on the entire surface on the substrate 31 in a thickness of 1 μm, and the organic insulating film 42 is formed as shown in FIG. 4(3). At step a7, a contact hole 43 is formed in the organic insulating film 42 by photolithography or dry etching process.

At step a8, on the entire surface of the organic insulating film 42 possessing bumps 42b, as shown in FIG. 4(4), a metal thin film made of aluminum is formed, and at step a9, as shown in FIG. 4(5), reflection electrodes 38 are patterned on the bumps 42b. The reflection electrodes 38 are connected with the drain electrodes 37 of the TFT 40 through the contact holes 43 formed in the organic insulating film 42. At the time of patterning of the reflection electrodes 38, it has been confirmed that no change is noted in the bumps 42a made of the photo resist beneath the organic insulating film 42, even after passing through the steps of exposure, development, aluminum etching, and resist peeling.

It is also known that the shape of the bumps 42a can be controlled by the shape of the mask 51, and the thickness of the photo resist as the bumps 42a. The corners of the bumps 42a may be easily removed by heat treatment after forming the bumps 42a.

The electrode 47 formed on the other substrate 47 shown in FIG. 1 is made of, for example, ITO, and is 1000 angstrom in thickness. The orientation films 44, 48 on the electrodes 38, 47 are formed by baking after applying polyamide or the like. Between the substrates 31 and 45, there is a free space for sealing a liquid crystal 49 by screen printing of an adhesive sealant not shown herein mixing a spacer of, for example, 7 μm or 12 μm, and by evacuating the free space, the liquid crystal 49 is injected. As the liquid crystal 49, for example, an optical active substance (tradename S811 of Merck) may be mixed by 4.5% into guest-host liquid crystal mixing black pigment (tradename ZLI2327 of Merck).

Figure 6:
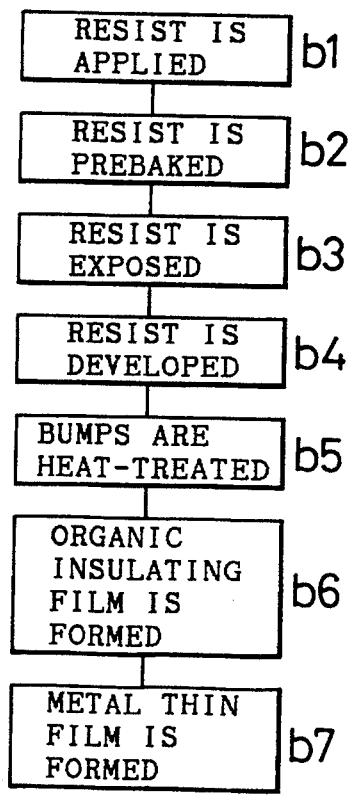
FIG. 6 is a process chart explaining the manufacturing process of a reflector 70 used in measurement of reflection characteristic of the reflection type liquid crystal display device 30 of the invention.

FIG. 6 is a diagram for explaining the manufacturing process of the reflector 70 used in measurement of reflection characteristic of the reflection type liquid crystal display device 30 of the invention, and FIG. 7 is a sectional view for explaining the process in FIG. 6. At step b1, as shown in FIG. 7(1), a resist material as photosensitive resin, for example, OFPR-800 (Tokyo Oka) is applied by spin coating at a speed of 500 to 3000 rpm, on one surface of the 1.1 mm thick glass (tradename 7059 of Corning). In this embodiment, applying for 30 seconds at 3000 rpm, a resist 72 was formed in a thickness of 2 μm. At step b2, the resist 72 was prebaked for 30 minutes at 100° C., and at step b3, as shown in FIG. 7(2), the resist 72 was exposed by placing a photo mask 52 possessing circular light shielding regions 51, 51b, and at step b4, as shown in FIG. 7(3), the resist 72 was developed, and irregular circular bumps 74 were formed on the surface of the substrate 71. As developer, 2.38% NMD-3 (Tokyo Oka) was used.

At step b5, by heating the bumps 74 on the glass substrate 71 preferably at 120° C.–250° C., the corners were removed as shown in FIG. 7(4), and smooth bumps 74 were formed. In the embodiment, heat treatment was conducted for 30 minutes at 180° C. At step b6, as shown in FIG. 7(5), an organic insulating film 74a was formed on the substrate 71 forming bumps 74. As the organic insulating film 74a, polyimide resin is applied by spin coating for 20 seconds preferably at 920 to 3500 rpm. In the embodiment, applying for 20 seconds at 2200 rpm, an organic insulating film 74a in a thickness of 1 μm was formed. On the organic insulating film 74a, bumps corresponding to the bumps 74 are formed, but they are smoother than the bumps 74. At step b7, as shown in FIG. 7(6), a metal thin film 75 was formed on the organic insulating film 74a. The thickness of the metal thin film 75 is preferably about 0.01 μm–1.0 μm. In the embodiment, the metal thin film 75 was formed by vacuum deposition of aluminum. As the metal thin film 75, aluminum, nickel, chromium, silver, or copper may be used. Since the metal thin film 75 is formed on the organic insulating film 74a formed along the bumps 74, it possesses irregular circular bumps 75a corresponding to the bumps 74. Hence, the reflector 70 was obtained.

Figure 8:
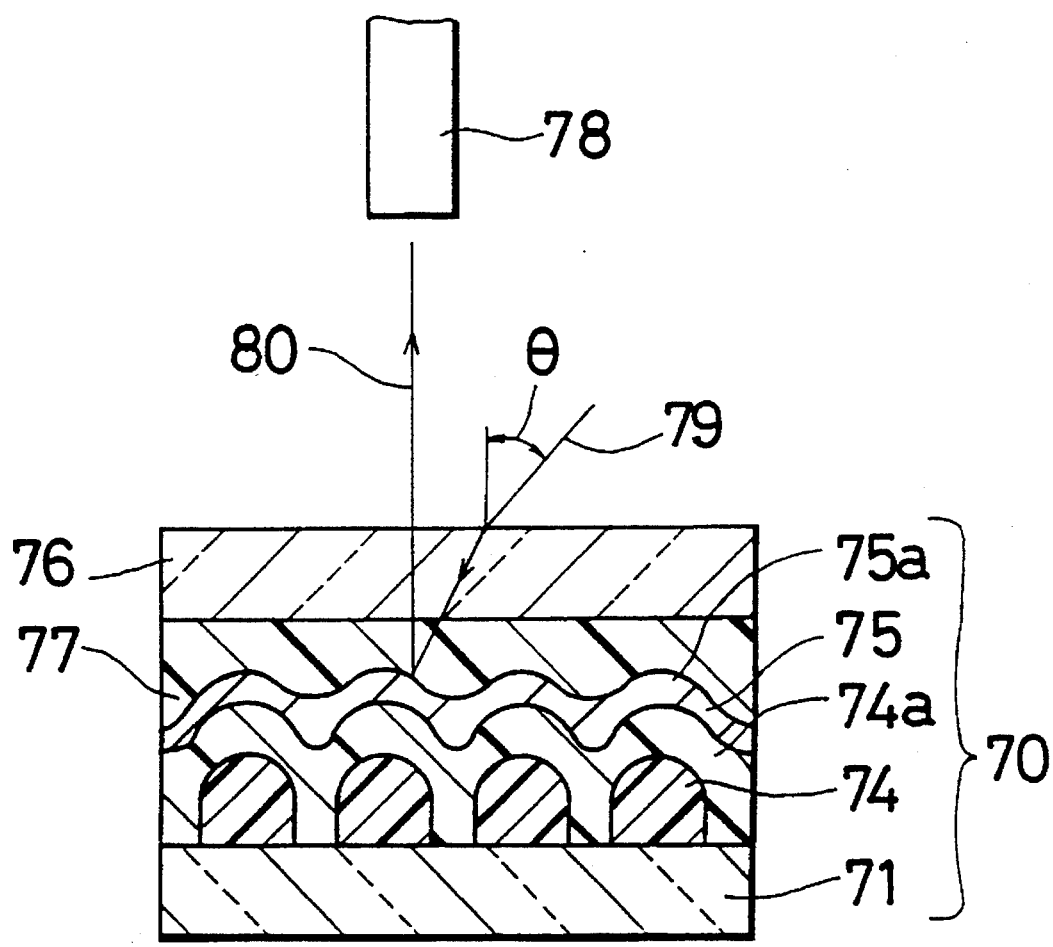
FIG. 8 is a perspective view explaining the measuring method of reflection characteristic of the reflector 70.

FIG. 8 is a side view for explaining the measuring method of the reflection characteristic of the reflector 70. Usually, the refractive index of the substrates 31, 45 and liquid crystal 49 layer used in the liquid crystal display device 30 is about 1.5 each. Assuming the composition in which the surface of the reflector 70 contacts with the liquid crystal 49 layer, in this embodiment, using an ultraviolet curing resin 77 with the refractive index of 1.5, the glass substrate 76 is brought into contact with the reflector 70, and the reflection characteristic of the reflector 70 was measured. The result of measurement has been confirmed to be same as the reflection characteristic in the boundary of the surface of the reflector 75 and the liquid crystal 49 layer.

As shown in FIG. 8, in the measurement of reflection characteristic, the scattered light 80 of the incident light 79 entering the reflector 70 is detected by a photo multimeter 78. The incident light 79 enters the reflector 70 at an angle of θ to its normal line. The photo multimeter 78 is fixed in the normal direction of the reflector 70 of the incident light 79 on the metal thin film 75 passing through the irradiated point. By varying the incident angle θ of the incident light 79, by measuring the intensity of the scattered light 80 by the metal thin film 75 by the photo multimeter 78, the reflection characteristic was obtained.

Figure 9:
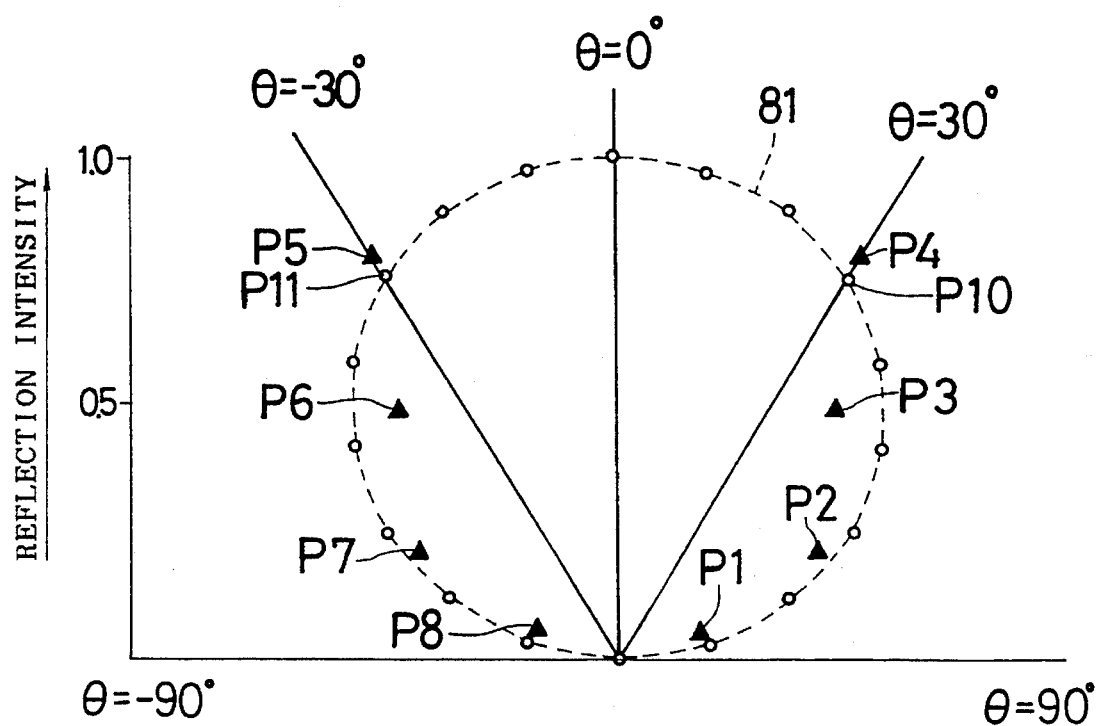
FIG. 9 is a graph showing the relation between the incident angle θ and reflection intensity.

FIG. 9 is a graph showing the relation between the incident angle θ and the reflection intensity. The reflection intensity of the incident light 79 at the incident angle θ is expressed as the distance from the origin O in the direction of angle θ to the line of θ=0°. The reflection intensity at θ=70° is expressed as P1, the reflection intensity at θ=60° as P2, the reflection intensity at θ=40° as P3, the reflection intensity at θ=30° as P4, the reflection intensity at θ=–30° as P5, the reflection intensity at θ=–40° as P6, the reflection intensity at θ=–60° as P7, and the reflection intensity at θ=–70° as P8.

FIG. 9 shows the reflection characteristic curve of a standard white panel of magnesium oxide by broken line 81. The reflection intensity P4 at θ=30° is superior to the reflection intensity P10 of magnesium oxide at θ=30°, and the reflection intensity at θ=–30° is also known to be superior to the reflection intensity P11 of magnesium oxide at θ=–30°.

Thus, according to the embodiment, the shape control is easy, and the reflection electrodes 38 along the bumps 42b are formed on the organic insulating film 42 possessing bumps 42b formed along the bumps 42a on the bumps 42a made of photo resist having repeatability. By controlling the shape of the bumps 42a, the reflection electrodes 38 possessing excellent reflection characteristic are obtained, so that the display quality of the reflection type liquid crystal display device may be enhanced.

The foregoing embodiment relates to the reflection type liquid crystal display device 30 of active matrix type in which the TFT 40 is used as the switching element, but this is not limitative, and similar effects are obtained in the reflection type liquid crystal display device of simple matrix driving system or others.

By properly selecting the type and film thickness of the photosensitive resin such as photo resist for forming bumps 42a, or heat treatment temperature, the inclination angle of the bumps 42a may be freely controlled, and hence it has been confirmed that the dependence of the reflection intensity on the incident angle θ can be controlled. Also by varying the type or film thickness of the organic insulating film 42 applied thereon, it has been recognized that the reflection intensity can be controlled. By varying the rate of occupation of the light shielding regions 51a, 51b of the mask 51, the size of the normal reflection components can be controlled.

Besides, when a voltage is applied between the reflection electrode 38 and electrode 47, the reflectivity in the panel normal direction to the light entering from a certain angle (θ=30°) was about 20%, and the contrast ratio was 5.

In the reflection type liquid crystal display device 30 of the embodiment, since the side of forming the reflection electrode 38 of the substrate 31 is disposed at the liquid crystal layer side, there is no parallax, and a favorable display quality is achieved. In the embodiment, since the reflection electrode 38 which is the reflection thin film of the substrate 31 is disposed at the liquid crystal 49 layer side, that is, at a position nearly adjacent to the liquid crystal layer 49, and therefore, the height of the bumps 42b is desired to be smaller than the cell thickness, and the inclination angle of the bumps 42b should be moderate so as not to disturb the orientation of the liquid crystal 49.

In the embodiment, moreover, patterning of the organic insulating film 42 was done by dry etching, but if the organic insulating film 42 is polyimide resin, it may be done by wet etching method by alkaline solution. As the organic insulating film 42, instead of the polyimide resin used in the embodiment, acrylic resin or other organic material may be used. As the substrate 31, in the embodiment, a transparent material made of glass or the like is used, but same effects are exhibited by opaque materials such as silicon substrate, and in this case it is a benefit that the circuit may be integrated on the substrate.

In the embodiment, the phase transitional guest-host mode is explained as the display mode, but it is not limitative, and similar effects are obtained, for example, in other light absorption mode such as two-layer guest-hot configuration, light scatter type display mode such as high molecular discrete liquid crystal display device, and birefringence display mode used in ferroelectric liquid crystal display device. Moreover, instead of the TFT 40 used as switching element in the embodiment, it may be also applied to active matrix substrate using, for example, MIM (metal-insulator-metal) device, diode, varistor, or the like.

The invention may be embodied in other specific forms without departing form the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A reflection type liquid crystal display device comprising:

a transparent substrate, an insulating substrate disposed oppositely to the transparent substrate, a liquid crystal layer interposed between the transparent substrate and the insulating substrate, plural reflection electrodes as display picture elements for reflecting the incident light from the transparent substrate side disposed on the liquid crystal layer side surface of the insulating substrate, distribution electrodes for applying display voltage to the reflection electrodes disposed on the liquid crystal layer side surface of the insulating substrate, and common electrodes possessing light transmissivity disposed nearly over the entire surface on the liquid crystal layer side surface of the transparent substrate, wherein the reflection electrodes are formed on an electric insulating film formed on plural rounded bumps formed of a photosensitive resin arranged irregularly in a region including the distribution electrodes, at the liquid crystal layer side on the insulating substrate, and adjacent reflection electrodes are formed in a predetermined region so as to be separated from each other by a spacing, and the bumps having plural shapes differing in size.

2. The reflection type liquid crystal display device of claim 1 wherein the reflection electrodes have a microlenticular surface with a surface profile corresponding to that of the underlying rounded bumps.

3. The reflection type liquid crystal display device of claim 1 wherein the bumps are formed over an insulating film on the surface of the insulating substrate.

4. The reflection type liquid crystal display device of claim 1 wherein the bumps are smooth without corners.

* * * * *